May 24, 1960

C. W. DIDDE ET AL 2,937,868

SHEET SUPPORTING AND HANDLING APPARATUS

Original Filed Jan. 24, 1955

INVENTORS.
Carl W. Didde
Donald A. Glaser
BY
ATTORNEY.

May 24, 1960    C. W. DIDDE ET AL    2,937,868
SHEET SUPPORTING AND HANDLING APPARATUS
Original Filed Jan. 24, 1955    6 Sheets-Sheet 2

Fig. 2.

INVENTORS.
Carl W. Didde
Donald A. Glaser
BY
ATTORNEY.

May 24, 1960 C. W. DIDDE ET AL 2,937,868
SHEET SUPPORTING AND HANDLING APPARATUS
Original Filed Jan. 24, 1955 6 Sheets-Sheet 4

INVENTORS.
Carl W. Didde
Donald A. Glaser
BY
ATTORNEY.

May 24, 1960

C. W. DIDDE ET AL 2,937,868

SHEET SUPPORTING AND HANDLING APPARATUS

Original Filed Jan. 24, 1955

INVENTORS.
Carl W. Didde
BY Donald A. Glaser

ATTORNEY.

United States Patent Office 2,937,868
Patented May 24, 1960

2,937,868

SHEET SUPPORTING AND HANDLING APPARATUS

Carl W. Didde, 1629 Dover Road, and Donald A. Glaser, 1520 West, both of Emporia, Kans.

Original application Jan. 24, 1955, Ser. No. 483,790, now Patent No. 2,846,214, dated Aug. 5, 1958. Divided and this application May 5, 1958, Ser. No. 732,901

3 Claims. (Cl. 271—30)

This invention relates to apparatus for handling sheet material and, more particularly, to an improved machine for gathering and assembling sheets of paper in predetermined order.

Since a knowledge of the disclosure of our prior U.S. Letters Patent No. 2,568,224, issued September 18, 1951, for "Paper Gathering Machine," will not only facilitate an understanding of certain broad principles common to apparatus of this general class, but will also expedite recognition of the nature and significance of the improvements contemplated by the present invention, such prior disclosure is hereby incorporated herein by reference.

This is a division of our copending application Serial No. 483,790, filed January 24, 1955, entitled "Paper Gathering Apparatus," now U.S. Patent No. 2,846,214.

The primary object of this invention is to provide improved paper gathering and assembling apparatus possessing increased operating versatility and dependability.

Among the most important specific objects of this invention are the provision of paper gathering and assembling apparatus adapted to handle various sizes of sheets with equal reliability and without substitution of parts; the provision of such apparatus capable of adhesively interconnecting the sheets of an assembled stack automatically during the gathering and assembly thereof to present a unitary pad; and the provision of such apparatus having means for positively assuring that one, but only one, of each kind of sheet to be included in an assembled stack is actually included in each of the latter in the proper order.

Other very important objects of this invention are the provision in such apparatus of sectionalized conveyor trays of advantageous construction; synchronized, moving, adhesive applicator means, including contact-responsive dispensing structure; suction-operated, sheet thickness-gauging means, including associated electrical, interlock structure for automatically interrupting operation of the apparatus in the event of an undesired measurement; improved, suction-operated, reciprocable, paper pick-up means; automatically variable, tilting lift tables; improved means for utilizing the perforations of perforated sheets to facilitate loading and to assure alignment during gathering; and automatically shiftable, intermittently operable, delivery roller means.

Still other important objects of this invention, including certain important details of construction, will be made clear or become apparent as the description of the invention progresses.

Broadly, the apparatus of this invention may include suitable prime movers, preferably of the electric motor type, drivingly coupled with suction pump means, pressure pump means and an endless conveyor having sectionalized trays carried thereby at predetermined, spaced intervals; a number of spaced, vertically reciprocable tables adapted to carry supply stacks of different sheets to be gathered and assembled in predetermined order; cam and ratchet means intercoupling the conveyor with the tables for automatically raising the latter; a number of suction-operated, vertically reciprocable, pick-up elements disposed over each table and shiftable to a position for lifting one end of a sheet from the top of the supply stack on the table to a point above the path of travel of the trays for deposit on the latter; cam and crank means intercoupling the conveyor with the elements for automatically shifting the latter to and from their operative position; suction-operated, thickness-gauging means disposed above each table for automatically determining that a single sheet has been lifted from the supply stack, such means having an electrical connection with the power circuit for the conveyor driving motor for interrupting the latter when other than a single sheet is lifted from the supply stack; automatically operable suction valve means for releasing the sheets from the pick-up elements and the gauging means onto the trays; rotatable adhesive applicator means coupled with the conveyor for rotation by the latter to deposit a quantity of adhesive upon a limited zone of the assembled stack of sheets on each tray as it passes the applicator; and means for removing the assembled stacks from the trays without disturbing the register thereof. Manifestly, the foregoing summary of certain of the structural elements provided is by no means exclusive and is intended only to give a general impression of the class of machine whose structure is hereinafter to be described in greater detail.

Figures 12, 13, 14, 15, 16:
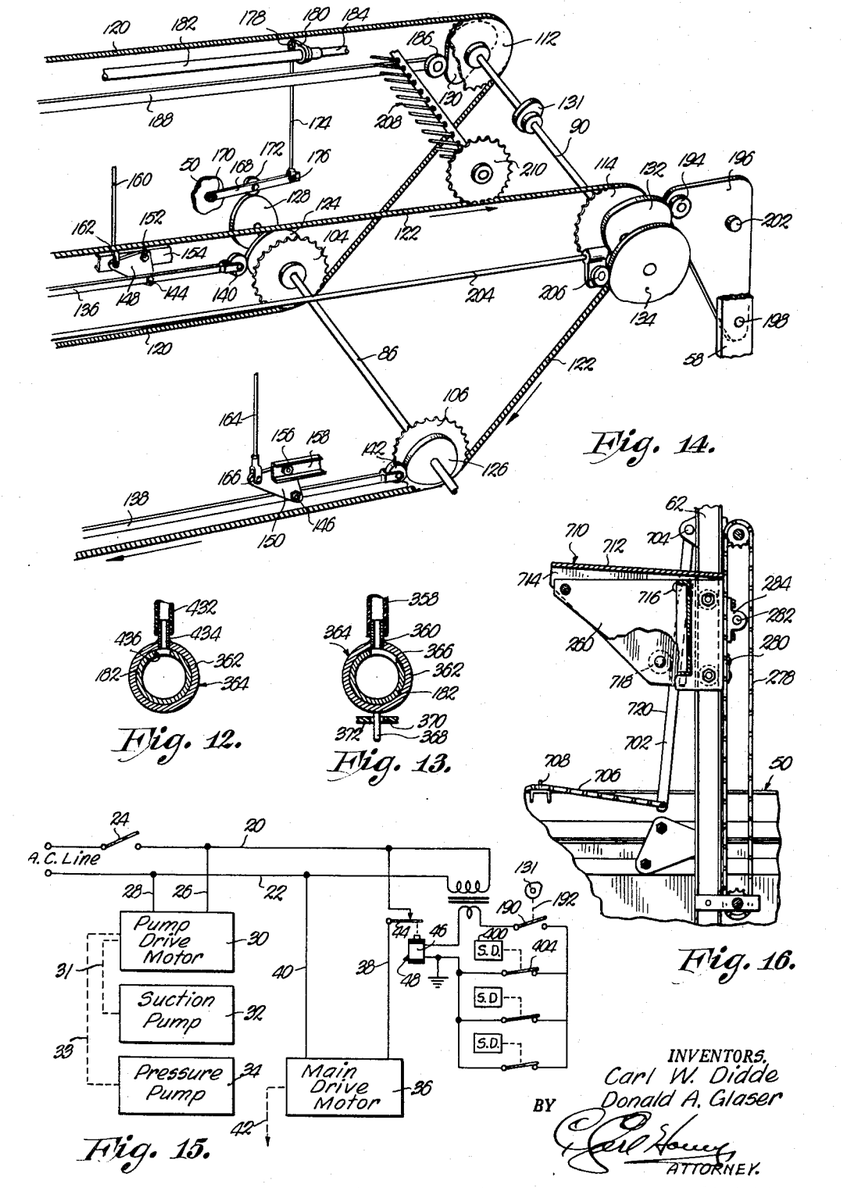
Fig. 12 is a cross-sectional view of the suction valve assembly taken on line XII—XII of Fig. 4.
Fig. 13 is a cross-sectional view of the suction valve assembly taken on line XIII—XIII of Fig. 4.
Fig. 14 is a perspective diagram of certain of the power transmitting and translating mechanisms used in the apparatus.
Fig. 15 is a schematic diagram of the electrical portion of the invention.
Fig. 16 is a fragmentary, cross-sectional view illustrating a modified form of feed table arrangement.

Referring first to Fig. 15, it will be seen that the apparatus of this invention includes a main electrical power circuit 20—22 adapted for coupling with a suitable source of power such as an alternating current line and having a main power switch 24 interposed in series with one side 20 thereof. Directly coupled with circuit 20—22 by conductive means 26—28 is an electric, pump drive motor 30 which is suitably coupled mechanically in any conventional manner with a suction pump 32 and a pressure pump 34, the couplings between motor 30 and pumps 32 and 34 being respectively indicated by dotted lines 31 and 33 in the figure just mentioned. Also provided is a main drive motor 36, which is electrically coupled with circuit 20—22 by conductive means 38—40 and mechanically coupled, as indicated at 42, with various parts of the apparatus, as will hereinafter more fully appear. It may be noted that a normally closed switch 44 associated with a coil 46 of a relay generally designated 48 is interposed in series with one side 38 of conductive means 38—40 and functions in the manner and for the purposes hereinafter more fully explained.

Figure 1:
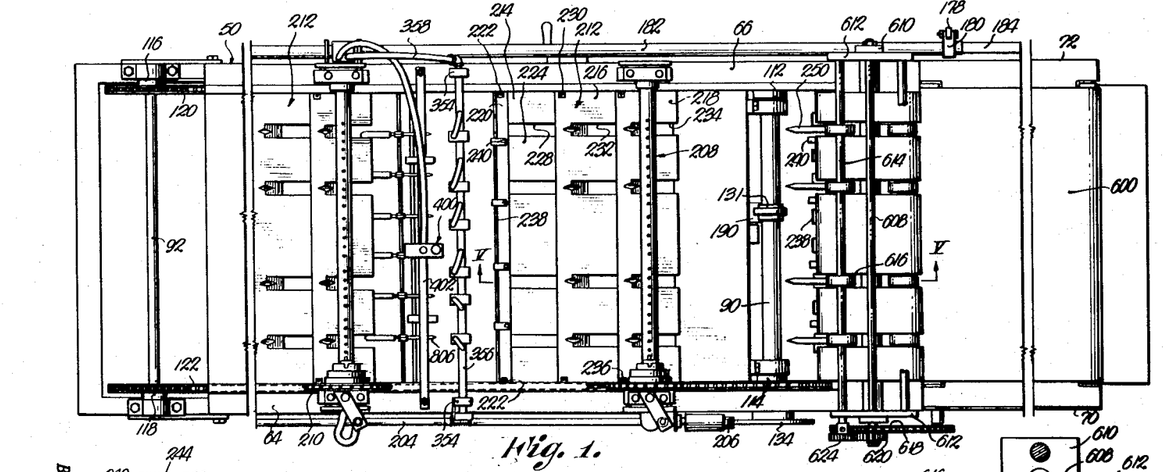
Figure 1 is a top plan view of apparatus made in accordance with this invention, with parts broken away and certain details omitted in order to clarify the illustration of major elements.
Figure 2:
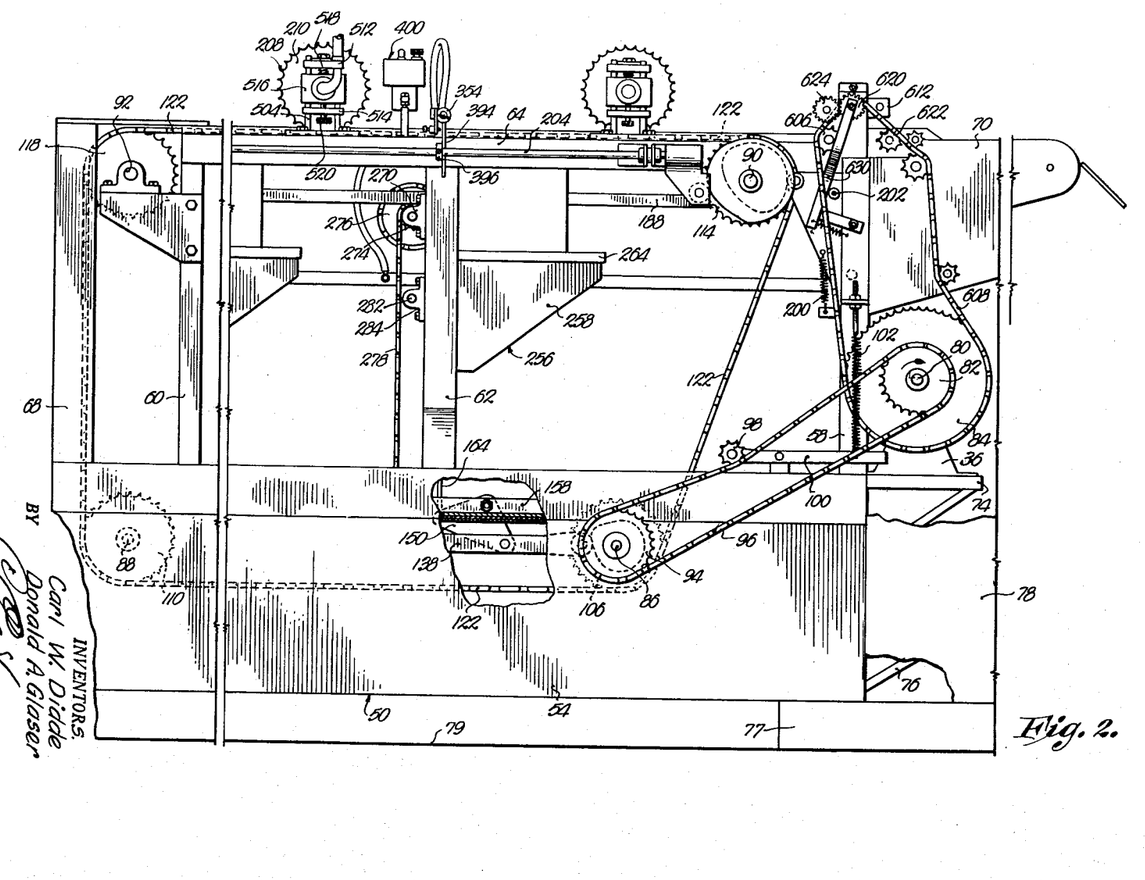
Fig. 2 is a side elevational view of such apparatus with parts broken away and some details omitted.

Referring now to Figs. 1, 2, 3 and 4, a frame assembly generally designated 50 is provided and may include, as illustrated, opposed, elongated, lower side assemblies 52 and 54; a number of longitudinally spaced crosspieces 56 interconnecting side assemblies 52 and 54; a pair of front posts 58, a pair of rear posts 60 and a number of pairs of intermediate posts 62 interconnected with assemblies 52 and 54 and extending thereabove; a pair of elongated, upper, side members 64 and 66 interconnecting the upper ends of posts 58, 60 and 62; a rear guard 68; a pair of opposed, forward, side plates 70 and 72; a pair of motor and pump-supporting platforms 74 and 76 on front posts 58; a front housing 78 partially shown in Fig. 2; and other bracing, supporting and housing structures, including some to be hereinafter more fully identified and others of a desirable but optional nature, such as guard covers for certain moving parts, which may be of any conventional construction and constitute no part of the invention claimed. Frame assembly 50 is preferably supported upon and secured to a number of mounting blocks 77 resting upon and secured to a floor or the like 79.

As shown in Fig. 2, the main drive motor 36 is mounted upon the platform 74, and it will be understood that the pump drive motor 30 and the pumps 32 and 34 are preferably mounted on platform 76 and are behind the housing 78 in the mentioned figure. Main drive motor 36 is coupled, preferably through a speed-reducing gear box (not illustrated), with a rotatable, horizontal, main drive shaft 80 suitably journalled and supported upon frame assembly 50 forwardly of front posts 58. A main drive sprocket 82 and an auxiliary drive sprocket 84 are rigidly mounted on drive shaft 80. Four horizontally and vertically spaced, conveyor shafts parallel to drive shaft 80 are provided and rotatably mounted on frame assembly 50, such shafts more particularly being identified as the lower front conveyor shaft 86, the lower rear conveyor shaft 88, the upper front conveyor shaft 90, and the upper rear conveyor shaft 92. A driven sprocket 94 is rigidly mounted on the lower front conveyor shaft 86 and is coupled with main drive sprocket 82 on drive shaft 80 by means of an endless chain 96. As illustrated, means in the nature of an idler sprocket 98 rotatably mounted upon a swingable lever 100, which lever is biased by an adjustably mounted spring 102, is preferably provided for maintaining the desired tension on chain 96.

As most clearly shown in Figs. 1, 2 and 14, lower front conveyor shaft 86 is provided with a pair of spaced conveyor sprockets 104 and 106, lower rear conveyor shaft 88 with a pair of sprockets 108 and 110, upper front conveyor shaft with a pair of sprockets 112 and 114, and upper rear conveyor shaft with a pair of sprockets 116 and 118. Trained over sprockets 104, 108, 112 and 116 is an endless conveyor chain 120; and a second endless conveyor chain 122 is trained over sprockets 106, 110, 114 and 118 in spaced relationship to chain 120. Chains 120 and 122 thus transmit power from shaft 86 to each of shafts 88, 90 and 92.

Fig. 14, in particular, also illustrates the majority of other power transmitting and translating assemblies utilized in the apparatus, their purposes and the nature of the remaining assemblies of such type being hereinafter more fully explained. Lower front shaft 86, besides carrying driven sprocket 94 (shown only in Fig. 2) and conveyor sprockets 104 and 106, is also provided with a pair of similar, eccentric cams 124 and 126 adjacent sprockets 104 and 106 respectively and with an individual, eccentric cam 128 adjacent cam 124. Upper front shaft 90 is provided with an individual, eccentric cam 130 adjacent sprocket 112, an individual, eccentric cam 131 between sprockets 112 and 114, and with an individual, eccentric cam 132 and an individual, eccentric cam 134 adjacent sprocket 114.

Figure 3:
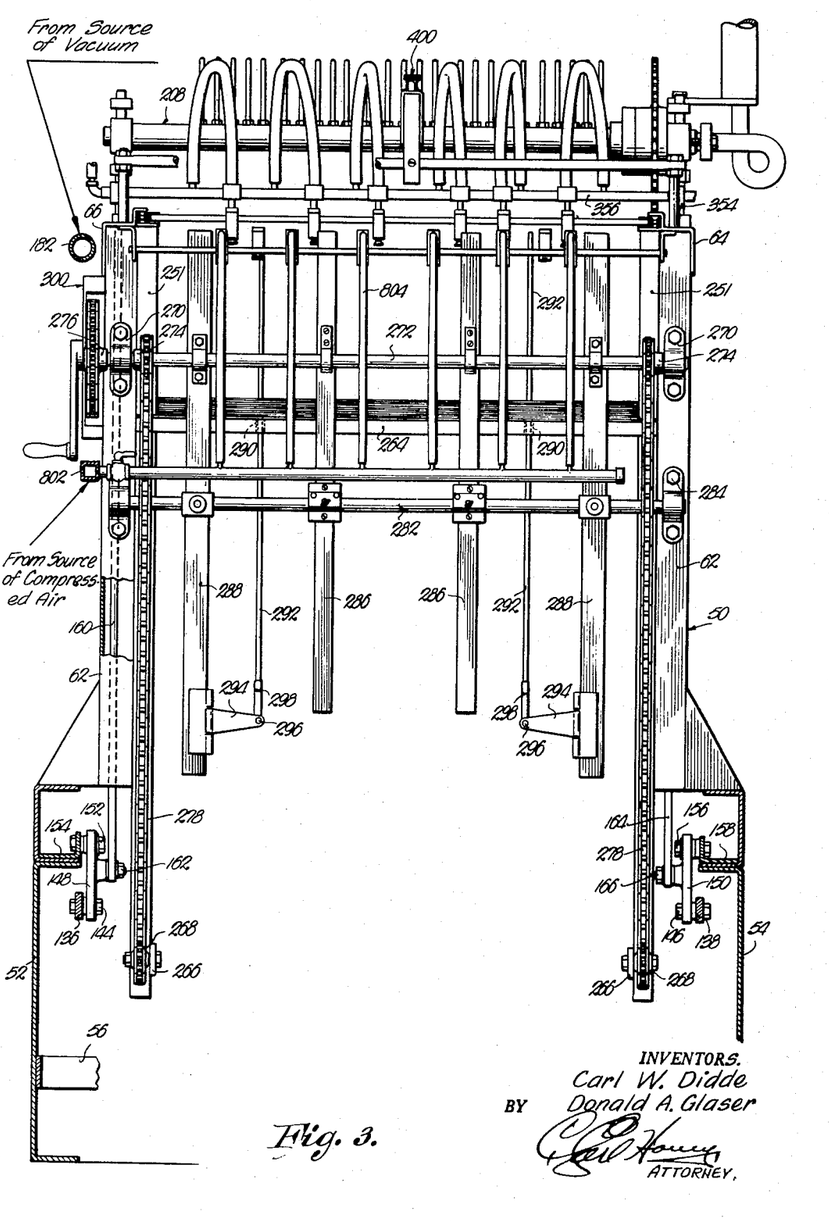
Fig. 3 is a transverse, cross-sectional view of such apparatus taken vertically through such apparatus showing one stack position and the main structure associated therewith with parts broken away and some details omitted.
Figures 4, 10, 11:
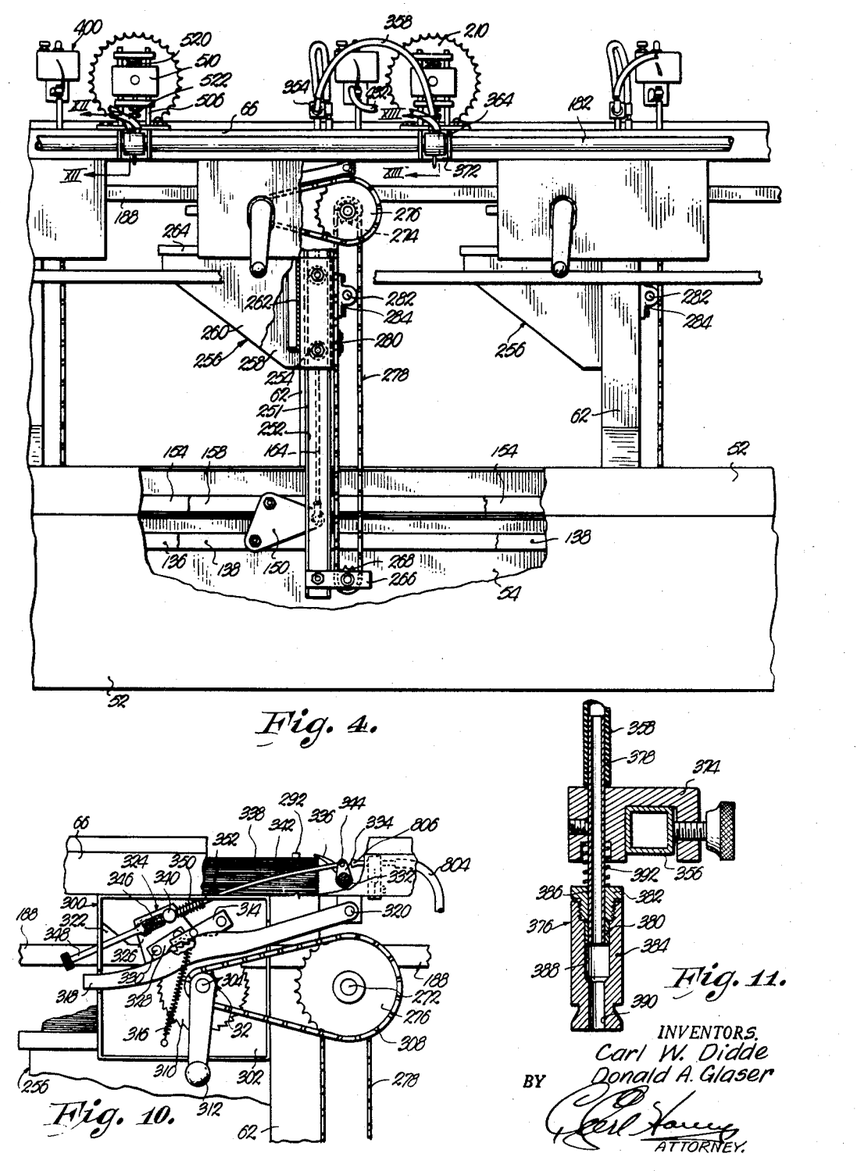
Fig. 4 is a fragmentary side elevational view of such apparatus taken from the side opposite to that shown in Fig. 2, parts being broken away and some details omitted.
Fig. 10 is an enlarged, fragmentary view, partly in elevation and partly in section, of the automatic table raising mechanism.
Fig. 11 is a cross-sectional view of one of the suction-operated, lift elements.

As shaft 86 is rotated, the pair of cams 124 and 126 respectively impart reciprocatory movement to a pair of elongated bars 136 and 138, which are provided with followers 140 and 142 respectively and are each yieldably biased in the direction of the corresponding cam 124 or 126 by any suitable spring means (not shown). Bars 136 and 138 are each supported by pivotal connection as at 144 and 146 respectively with a corresponding set of crank plates 148 and 150, one each of which is illustrated in Fig. 14. Each of the crank plates 148 is in turn pivoted as at 152 to a bracket 154 on lower side assembly 52, while each of the crank plates 150 is similarly pivoted as at 156 to a bracket 158 on lower side assembly 54, as also shown in Figs. 2, 3 and 4. Each crank plate 148 is further provided with an upwardly extending, vertically reciprocable rod 160 pivoted to plate 148 as at 162, and each crank plate 150 is similarly provided with such a rod 164 pivoted thereto as at 166. As crank plates 148 and 150 are swung by horizontal reciprocation of bars 136 and 138, rods 160 and 164 reciprocate vertically for purposes hereinafter to be made clear.

Rotation of shaft 86 also imparts swinging movement to an arm 168 pivotally mounted adjacent one end thereof on frame 50 as at 170, by virtue of the action of cam 128 upon a follower 172 carried by arm 168 intermediate its ends. A rod-like element 174 is pivotally connected at its lower extremity, with the opposite end of arm 168 as at 176, and has its upper extremity pivotally connected as at 178 with a crank member 180 mounted on a rotatable portion 182 of a telescoped, suction pipe assembly 184. As arm 168 is swung, element 174 reciprocates vertically to swing crank 180 and rock portion 182 relative to the remainder of pipe 184, for purposes hereinafter to be explained.

As shaft 90 is rotated, cam 130 acts upon a follower 186 provided on a horizontally reciprocable, elongated member 188, to reciprocate the latter for purposes hereinafter to be detailed with particular reference to Fig. 10. It is to be understood that any suitable means (not shown) are provided for reciprocably mounting member 188 on frame 50 and for yieldably biasing the same toward cam 130.

Rotation of shaft 90 also causes rotation of cam 131 to alternately open and close a normally open, single-pole, single-throw, electrical switch 190 (shown only in Fig. 15), the mechanical coupling between cam 131 and switch 190 being conventional and indicated by the dotted line 192 in the last-mentioned figure. The function of switch 190 will be more fully treated hereinafter.

Cam 132, which likewise rotates with shaft 90, actuates a follower 194 provided on a triangular plate 196, which is in turn swingably mounted on front post 58 as at 198, to swing plate 196 about pivot 198. As indicated in Fig. 2, plate 196 is yieldably biased toward cam 132 by spring means 200 and is provided with a lateral extension 202 having the functions hereinafter disclosed.

Rotation of shaft 90 moreover rotates cam 134, which in turn reciprocates horizontally reciprocable, rod-like member 204 having a cam-engaging follower 206. Member 204 is also mounted for reciprocation on frame 50 and is yieldably biased toward cam 134 by any suitable means which will not be here detailed. The purposes and functioning of member 204 will, however, be hereinafter set forth in appropriate order of mention.

Finally, with respect to Fig. 14, there is illustrated one of a number of adhesive applicators 208 provided in the apparatus of this invention. Each applicator 208 is elongated, extends transversely of frame 50, is rotatably mounted on the latter by means hereinafter described, and is provided with a sprocket 210 in operative relationship with chain 122, whereby the applicators 208 are rotated as chain 122 is advanced by rotation of shaft 86 and, accordingly, sprockets 106, 110, 114 and 118.

It will be clear, therefore, that rotation of shaft 86, by its driving connection with power shaft 80 through sprocket 82, chain 96 and sprocket 94, results in: (1) rotation of cams 124 and 126 thereon causing reciprocation of bars 136 and 138 and, in turn, swinging of plates 148 and 150 and reciprocation of rods 160 and 164; (2) rotation of cam 128 thereon causing swinging of arm 168 and, in turn, reciprocation of element 174, swinging of crank 180 and rotation of pipe portion 182; and (3) rotation of sprockets 104 and 106 causing advancement of chains 120 and 122 and, in turn, rotation of sprocket pairs 108—110, 112—114 and 116—118 and their respective shafts 88, 90 and 92, as well as rotation of sprockets 210 and, accordingly, applicators 208. Rotation of shaft 90, in turn, results in: (1) rotation of cam 130 causing reciprocation of member 188; (2) rotation of cam 131 causing intermittent closing of switch 190; (3) rotation of cam 132 causing swinging of plate 196; and (4) rotation of cam 134 causing reciprocation of member 204. It will be obvious that such interrelationship of moving parts defines a cooperably timed and coordinated system of power translation and transmission. The uses made of the various available motions in the apparatus of this invention will be hereinafter made apparent. It may be presently pointed out, however, that, as those skilled in the art will readily understand, the sizes of the various sprockets and the sizes and shapes of the various cams are chosen and carefully interrelated to yield the cooperatively timed relationships between the operations of various working parts of the apparatus hereinafter described. Since the precise constructions of the various cams and sprockets will obviously depend upon the desired size and operational speed of the over-all apparatus, and since the considerations for constructing same will be readily apparent to those skilled in the art in the light of this disclosure, it is deemed unnecessary to describe the various cams and sprockets above-mentioned in greater detail.

Figure 5:
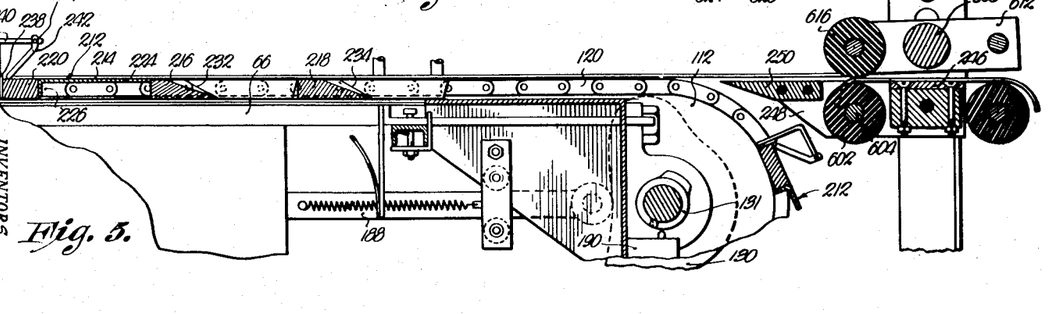
Fig. 5 is an enlarged, cross-sectional view taken on line V—V of Fig. 1.

Reference is now made to Figs. 1 and 5, wherein are illustrated a number of sectionalized, paper-carrying tray assemblies 212. A plurality of such tray assemblies 212 are provided and equally spaced along chains 120 and 122, between which they extend and by which they are carried, such spacing being at predetermined intervals chosen in accordance with the dimensions of the over-all apparatus and the disposition and timing of operation of other working parts of such apparatus, as elsewhere herein indicated.

Each tray assembly 212 includes a plurality of elongated sections 214, 216 and 218 of approximately equal widths. Rear section 214 of each tray assembly 212 comprises an elongated bar 220 extending between chains 120 and 122 and attached at its ends to chains 120 and 122 by any suitable bracket and fastening means 222, and a number of L-shaped, laterally extending, coplanar plates 224 spaced along the forwardmost edge of bar 220, extending forwardly from the latter and secured thereto by screws or the like 226. The lateral spacing between plates 224 presents a number of notches 228 therebetween extending across a major portion of the width of the section 214. The intermediate section 216 of each tray assembly 212 is disposed immediately forwardly of the section 214 thereof and is likewise elongated and extends between chains 120 and 122. Each section 216 is secured at its ends to chains 120 and 122 by conventional bracket and fastening means 230, and is provided with a number of elongated notches 232 spaced along its forwardmost edge in alignment with notches 228 of the adjacent section 214. Each section 218 is disposed immediately forward to the corresponding section 216, is substantially similar to the latter, is provided with spaced notches 234 along its forwardmost edge in alignment with the notches 228 and 232 of sections 214 and 216, and is secured at its ends to chains 120 and 122 by bracket and fastening means 236.

Each tray 212, or more specifically, each section 214 is provided with a number of laterally spaced, upstanding rear paper stops 238 and with a number of laterally spaced, upstanding, rear paper holders 240 secured upon the rearmost edge of the section 214. Each holder 240 includes an L-shaped bracket portion, as best shown in Fig. 5, and is provided with a loosely swingable, gravitationally biased element 242 pivoted at its upper extremity to the L-shaped bracket portion of holder 240 as at 244. As will hereinafter become more apparent, when a tray 212 advances beneath a sheet of paper being held thereabove in a manner hereinafter to be explained (not shown in Figs. 1 or 5), the rear edge of the paper engages element 242 of holder 240, thereby swinging element 242 rearwardly to permit passage of said edge of the paper between element 242 and bar 220 of section 214; element 242 then swings back to its normal gravitated position to hold the paper upon section 214 with the rear edge of the paper abutting stops 238 and the rear legs of the holder brackets 240.

Still referring to Figs. 1 and 5, there is provided upon the forward part of frame 50, preferably extending between front posts 58 adjacent the tops of the latter, a crosspiece 246 to which are secured in any suitable fashion a plurality of vertical plates 248. Each plate 248 extends rearwardly from crosspiece 246 and is provided at its rear extremity with a pointed, rearwardly extending, stripper element 250. As will be clear from the drawings, there is a plate 246 and a stripper element 250 for each set of notches 228—232—234 in the trays 212 and the elements 250 are so disposed as to enter in succession the notches 234, 232 and 228 as the portions of chains 120 and 122 adjacent tray sections 214, 216 and 218 respectively commence their downward movement around conveyor sprockets 112 and 114. Elements 250 function, therefore, to strip from trays 212 any papers carried by the latter just as the trays 212 start to descend from their theretofore horizontal course toward the front of the apparatus.

Manifestly, the facts that the trays 212 are sectionalized and that each section 214, 216 and 218 of each tray 212 is notched as at 228, 232 and 234 respectively, makes it possible for sheets of paper of virtually any size to be positively removed from the trays 212 by the stripper elements 250. With conventional, prior constructions, such result could not be obtained, and it was necessary to either substitute entirely different paper carrying trays or to make an adjustment of stop means thereon in the apparatus for each range of paper sizes to be handled.

Referring now especially to Figs. 2, 3, 4 and 10, wherein are illustrated the means for receiving a plurality of piles of paper or other sheet material to be gathered and assembled into stacks including a single sheet from each pile arranged in predetermined order and the means for automatically raising each of such pile receiving means to an operative position and maintaining the same at such position as sheets are removed from the pile thereon, it will first be noted that each of the intermediate posts 62 is provided with an inwardly facing, vertical channel member 251 thereon so that each pair of opposed posts 62 present a pair of opposed, vertical tracks 252 for receiving a number of guide rollers 254 rotatably mounted on opposite sides of a feed table assembly 256.

Each of the feed table assemblies 256, of which there is one for each opposed pair of intermediate posts 62, includes a pair of spaced-apart, parallel side plates 258 and 260 interconnected by a vertical back plate 262 and carrying a top 264 secured thereto in any suitable fashion. Top 264 is, of course, adapted to receive a pile of paper or cut sheet material and to lift the latter as the assembly 256 is raised to a position where apparatus hereinafter to be described may remove the sheets from the pile one at a time for placement upon a tray 212 as the latter passes the particular position or station defined by that pair of opposed posts 62, its table assembly 256 and the other structure associated therewith.

Each channel member 251 is provided adjacent its lowermost end with a lateral extension 266 upon which is rotatably mounted an idler sprocket 268. Each of posts 62 is provided adjacent its upper end with a bearing 270. Bearings 270 rotatably mount a shaft 272 upon which are rigidly affixed a spaced pair of small sprockets 274 and a larger sprocket 276. The pair of sprockets 274 are disposed directly above the pair of sprockets 268 and each corresponding pair of sprockets 268 and 274 carries an endless chain 278. Fastening means 280, which may be of conventional type, is provided on each of chains 278 and connect the latter with the feed table assembly 256, whereby table 256 may be raised and lowered as the chains 278 progress in one direction or the other about sprockets 268 and 274.

A cross member 282 extends between each opposed pair of intermediate posts 62 and is rigidly secured to the latter by means 284. A number of elongated, vertical paper guide elements 286 are adjustably secured to cross member 282 and serve to maintain the front edge of the pile of papers or cut sheet material upon top 264 of table assembly 256 in vertically aligned disposition. Other elongated, vertical guide elements 288 are provided and also secured to the cross element 282. As indicated in Fig. 3, top 264 of table 256 may be provided, as shown for illustration, with a number of perforations 290 disposed to coincide with perforations which may be encountered in the type of papers that have been punched to accommodate carrying pins for facilitating handling. A pair of such elongated, vertical guide pins 292 are shown supported adjacent their lowermost ends by means 294 provided on guides 288 and extend upwardly therefrom through perforations 290 of top 264 to a level slightly above that of the top of the pile of papers upon table assembly 256 when the latter is in operative position. Mounting means 294 for pins 292 are preferably hinged to guides 288 and include an oppositely disposed pivotal connection 296 in order that pins 292 may swing slightly in any direction to prevent binding between pins 292 and perforations 290 as the table assemblies 256 are raised or lowered. Pins 292 may include a threaded coupling 298 to permit securement fo pins 292 upon mounting means 294 when papers stacked on such pins 292 for handling are being piled upon the table assembly 256 for processing in the apparatus. When papers are not so preloaded on pins 292, the latter may obviously be removed. The use of pins 292, when used, thus serve to supplement the action of guide elements 286 and 288 in maintaining the papers of a pile upon the assembly 256 in properly aligned condition.

Referring now particularly to Fig. 10, there is illustrated the means by which chains 278 are automatically operated to maintain each table 256 in proper operative position in response to the number of papers remaining in the pile carried by the table assembly 256. There is provided on each intermediate post 62 on the side of the apparatus carrying upper frame member 66 a box-like housing 300 including a mounting plate 302. A stub shaft 304 is rotatably journalled upon mounting plate 302 in parallelism with shaft 272. Stub shaft 304 carries a sprocket 306 which is operably connected with large sprocket 276 of shaft 272 by an endless chain 308. Shaft 304 also carries a ratchet wheel 310 and a hand crank 312. A swingable dog 314 is pivotally mounted upon plate 302 and yieldably biased by a spring 316 toward engagement with ratchet 310 for preventing retrograde movement of the latter. A swingable lever 318 pivotally mounted upon frame 30 as at 320 is engageable with dog 314 and may be manually swung upwardly as in Fig. 10, to raise dog 314 out of engagement with ratchet 310 to permit manual operation of crank 312 to move chains 278 for quickly raising or lowering the table assembly 256 to a desired starting position. It should be noted, however, that table 256 will be automatically brought to the desired operating position, even in the absence of adjustment by hand crank 312, by the mechanism about to be described.

It will be observed that the reciprocable member 188 passes through the housing 300 and is provided within the latter with a triangular projection 322. A swingable plate assembly 324 is rotatably mounted upon shaft 304 and carries thereon a follower 326 engageable with the sloping edge of projection 322 when plate assembly 324 is swung sufficiently counterclockwise in Fig. 10 and member 188 is reciprocated to the right in said figure. A ratchet engaging dog 328 is pivotally mounted upon plate assembly 324 as at 330 and normally rests upon the upper surface of ratchet wheel 310 by virtue of the action of gravity. Since the whole plate assembly 324 also tends by the action of gravity to swing counterclockwise as shown in Fig. 10, it will be clear that in the absence of means arresting such counterclockwise movement of plate assembly 324, follower 326 will be engaged by projection 322 of reciprocating member 188 each time the latter is reciprocated to the right in Fig. 10, and that plate assembly 324 will thereby be swung clockwise moving dog 328 to advance ratchet wheel 310 one step in a clockwise direction as shown in said figure. Such rotation of ratchet wheel 310 will rotate shaft 304 and, through sprocket 306, chain 308 and sprocket 276, will also rotate shaft 272 and sprockets 274 to advance chains 278 in a direction for raising the table assembly 256.

In order to control such raising of the table assembly 256, there is provided a horizontal shaft 332 rotatably mounted upon frame 50 in any suitable manner and carrying a crank 334 having a number of paper sensing fingers 336 adapted to rest upon the top paper of a pile 338 thereof when the latter has been raised to a certain height. Plate assembly 324 is provided with a suitable bracket 340 adapted to receive in sliding relationship thereto an elongated rod 342 which is pivotally attached to the crank 334 at one end thereof as at 344 and is threaded on the opposite end thereof extending through bracket 340 as at 346. An internally threaded extension 348 receives threaded portion 346 of rod 342 for adjustment of the length of rod 342 disposed between bracket 340 and crank connection 344 against the yielding bias of a spring 350 disposed between bracket 340 and a pin 352 affixed to rod 342. The action of gravity upon plate assembly 324 normally pulls rod 342 downwardly and to the left as shown in Fig. 10, thereby yieldably biasing the paper sensing fingers 336 in a downward direction upon the topmost paper in pile 338. As continued reciprocation of member 188 and consequent advancement of ratchet wheel 310 raises table assembly 256 and pile 338 thereon, the fingers 336 are gradually swung upwardly, thereby rotating crank 334 clockwise as shown in Fig. 10, and pulling rod 342 toward the right. Such action swings the plate assembly 324 in a clockwise direction as shown in the figure and toward a position where reciprocation of member 188 will no longer cause sufficient engagement between projection 322 and follower 326 to result in advancement of the sprocket wheel 310 by the dog 328. This, of course, is the equilibrium situation by which further raising of the table assembly 256 is automatically prevented once the latter has reached the desired operative position by the action of the pile 338 upon the sensing fingers 336 and the swinging of plate assembly 324 to an inoperative position as just described. Obviously, as sheets are removed from the top of pile 338 as hereinafter explained, sensing fingers 336 will gradually swing downwardly until plate assembly 324 is swung to a position again resulting in advancement of the ratchet wheel 310 and raising of the table 256 to the desired operative position.

Attention is now especially directed to Figs. 1, 2, 3, 4, 12 and 13, wherein are illustrated the means for lifting the top sheet of a pile of paper or the like carried by each table 256 therefrom and depositing the same upon a tray 212 while the latter continues to move by virtue of the continuous advancement of conveyor chains 120 and 122. Each vertically reciprocable rod 160 and 164 is provided at the uppermost end thereof, which is slightly above the upper frame members 64 and 66, with a bearing assembly 354. The bearing assemblies 354 of each opposed pair of rods 160 and 164 rotatably carries an elongated, tubular element 356, which extends laterally across the apparatus. Each tube 356 is coupled by a flexible hose 358 with a corresponding outlet 360 on sleeve 362 of a suction valve assembly generally designated 364 and most clearly shown in Figs. 4, 12 and 13. It will be observed that suction pipe portion 182 is provided with an elongated opening 366 underlying each sleeve 362, and that each sleeve 362 has a pin 368 extending therefrom and received by a slot 370 in a bracket 372 mounted upon the upper side member 66. Pin 368 and bracket 372 prevent rotation of sleeve 362, while pipe portion 182 is being continuously, rotatively oscillated by the action of crank 180 responsive to cam 128 as hereinbefore described. It may be noted that the extent of rotative oscillation of pipe portion 182 relative to the sleeves 262 is such that the outlet 360 of each of the sleeves 362 is closed at one end of the oscillatory swing and opened for a predetermined period therebetween. Obviously, whenever the outlets 360 are in communication with their corresponding openings 366 the suction existing in pipe portion 182 is transmitted through the flexible hoses 358 to the various tubular elements 356.

Carried by brackets 374 upon each of tubes 356 are a number of sucker lift assemblies generally designated by the numeral 376. The construction of the sucker lift assemblies 376 is best shown in Fig. 11 to include a vertical tube 378 receiving hose 358 at its upper end, rigidly carried by bracket 374 and extending below the latter and provided with a piston 380 upon its lowermost end. A two-piece cylinder 382—384 has a bore 386 slidably receiving tube 378 and is provided with a cylindrical chamber 388 in which piston 380 is free to reciprocate. Cylinder chamber 388 communicates with the bottom of assembly 382—384 by means of a reduced diameter bore 390. Interposed between bracket 374 and the upper portion of cylinder assembly 382—384 is a resilient spring 392, which yieldably biases cylinder assembly 382—384 downwardly from bracket 374. The normal position of piston 380 within chamber 388 is, therefore, at the top of the latter with the cylinder assembly 382—384 biased by spring 392 to the lowermost end of its path of travel relative to tube 378 and bracket 374. So long as the lowermost end of bore 390 is not obstructed, it will be clear that the suction transmitted by hose 358 to tube 378 and thence through the hollow piston 380 will be in communication with the atmosphere by means of bore 390 and no relative movement between cylinder assembly 382—384 and piston 380 will occur. However, when the lowermost end of bore 390 is obstructed, as when the lowermost end of cylinder assembly 382—384 is placed upon a sheet of paper, the force of the suction created in chamber 388 will lift cylinder assembly 382—384 against the action of spring 392 in order to minimize the volume in chamber 388 being subjected to the evacuation process. Naturally, the paper which is closing the lower end of bore 390 is thus held and raised so long as the suction is being communicated to the lift assembly 376 by proper positioning of the corresponding valve assembly 364.

It is to be understood that the relative timing between reciprocation of rods 160 and 164, the operation of suction valve assembly 364 through rocking of pipe 182, and the advancement of conveyor chains 120 and 122 is such that the sucker lift assemblies 376 are lowered into contact with the uppermost sheet of paper or the like upon the feed table assembly 256, that suction valve 364 will then operate to create a suction in lift assemblies 376 for picking up such top sheet of paper, that rods 160 and and 164 will then be reciprocated to lift the end of such sheet of paper disposed toward the next advancing tray 212 above the path of travel of the latter, and that the suction in lift assemblies 376 will be continued by valve 364 until such tray 212 has passed completely under the lifted sheet of paper and been properly emplaced upon the top of such tray 212. Valve 364 will then operate to cut off the suction in lift assemblies 376, thereby releasing the paper for travel with the tray 212 upon which it has been deposited. It will be noted in Fig. 2 that one end of each suction tube 356 is provided with a depending crank element 394 engageable by an adjustable stop 396 upon reciprocating rod 204. The reciprocation of such rod 204 is timed so that stop 396 operates upon element 394 to rotate tube 356 through a small arc just as pick-up of the sheet of paper from the stack upon tray 212 is being accomplished. This results in a swinging of the lift assembly 376 from its normal perpendicular relationship with the sheet of paper and aids in the separation of the top sheet of paper from the sheets therebelow.

Figure 8:
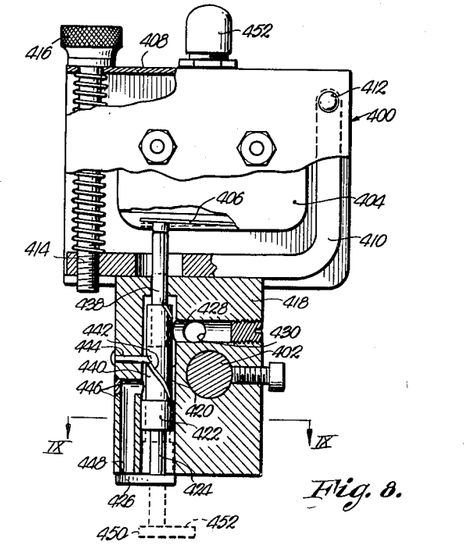
Fig. 8 is a view, partly in side elevation and partly in section, of one of the sheet detectors with parts broken away for clarity of illustration.
Figure 9:
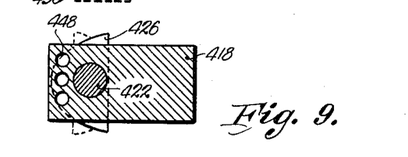
Fig. 9 is a cross-sectional view taken on line IX—IX of Fig. 8.

Attention is now directed particularly to Figs. 1, 2, 3, 4, 8 and 9 wherein the numeral 400 generally designates a sheet detector. One of such sheet detectors 400 is provided for each material lifting table 256 and is supported rigidly upon a crosspiece 402 immediately adjacent the path of reciprocation of the corresponding suction tube 356 and the lift assemblies 376 mounted on the latter. Referring particularly now to Figs. 8 and 9 wherein the sheet detector 400 is shown in detail, it is first noted that the purpose of such apparatus is to detect the thickness of the sheet or sheets if any actually lifted by the lift assemblies 376 from the corresponding lift table 256. The sheet detectors 400 provide an interlock means for stopping the operation of the apparatus in the event that either a particular set of lift assemblies 376 fails to raise any sheet of paper into position for deposit upon an advancing tray 212 or in the event that such lift assemblies 376 pick up more than a single sheet of paper and dispose same for deposit upon the tray 212. Since the apparatus of this invention is adapted for automatically gathering and assembling groups of papers including a single sheet from each of the lift tables 256 with same arranged in predetermined order, the importance of assuring that one but only one of each kind of sheet is gathered in turn upon the trays 212 by the operation of the lift assemblies 376, is apparent. Each sheet detector includes a switch assembly 404, which may be in the nature of a micro-switch, having a swingable operating arm 406. As will be clear from Fig. 15, opening of the switch 404 of any of the sheet detectors 400 will immediately result in de-energization of the relay coil 46 and, therefore, de-energization of the main drive motor 36. Switch 404 is mounted in any suitable fashion upon a frame structure 408 upon which is swingably mounted an L-shaped member 410 adapted for being adjustably positioned about a pivot 412 by operation of an adjusting screw 414 having an accessible knob 416. Mounted upon swingable member 410 and depending therefrom is a cylinder block 418, the latter being carried by crosspiece 402 in fixed position thereon. Block 418 is provided with an elongated, vertical cylinder chamber 420 in which is disposed a vertically reciprocable piston 422. Cylinder 420 is open at the lowermost end thereof to clear a depending extension rod 424 connected with piston 422 at its uppermost end and carrying on its lowermost end a substantially semicircular thickness sensing element 426 whose operation will shortly be described. Block 418 is provided with a passageway 428—430 communicating with cylinder chamber 420 and connected through flexible tubing 432 with a second outlet 434 on sleeve 362 of suction valve assembly 364. It will be noted from Fig. 12 that suction tube 182 is provided with a second elongated opening 436, which is adapted to communicate with outlet 434 when suction pipe 182 is swung to one end of its path of oscillatory movement. Communication of outlet 434 with opening 436 thus occurs midway during the time when opening 366 is in communication with outlet 360. An upwardly extending rod 438 having an enlarged portion 440 within cylinder chamber 420 is connected at its lowermost end with piston 422 and bears at its uppermost end against arm 406 of switch 404 for operating the latter as piston 422 is reciprocated within cylinder 420. Enlarged portion 440 of rod 438 is provided with a spiral grooves 442 into which a pin 444 mounted in block 418 extends. It will thus be clear that, as piston 422 is reciprocated within cylinder 420 as hereinafter explained, the piston 422 and accordingly extension 424 and sensing element 426 will be rotated relative to the block 418. Block 418 is also provided with a number of passages 446 communicating at their lowermost end with the bottom of block 418 and the atmosphere as at 448. It will be noted from Fig. 15 that each of the switches 404 is normally closed and it will be understood that such switches 404 are opened only when the piston 422 of the sheet detector 400 is reciprocated upwardly in a manner hereinafter to be explained to operate the arm 406 of the switch 404. It will also be noted from such figure that the switches 404 are connected in series with the normally open, cam-operated switch 190. From this, it will be observed that coil 46 will be energized and main drive motor 36 accordingly de-energized only when both switch 190 and one of the sheet detector switches 404 are simultaneously closed. The cam 131 is timed so as to close switch 190 momentarily during the period that opening 436 of suction valve assembly 364 is in communication with outlet 434. It will thus be apparent that, if the suction imposed upon the upper face of piston 422 by virtue of opening 436 coming into communication with outlet 434 can be utilized to reciprocate the piston 422 upwardly, it will operate arm 406 thereby opening the switch 404. During the period when cam 131 closes switch 190, the above referred to series circuit through switches 190 and 404 will still remain broken and coil 46 will not be energized to stop motor 36.

The normal position of the piston 422 and its associated parts are illustrated in Figs. 8 and 9 by dotted lines, the upwardly reciprocated position of same for operating arm 406 to open switch 404 being indicated in solid lines. From the figure it will be clear that, because of passage 446 placing that portion of cylinder 420 above piston 422 in communication with the atmosphere as long as end 448 of passages 446 remain unobstructed, the piston 422 will not be reciprocated upwardly from its normal position whenever suction is imposed upon the upper portion of chamber 420 through passage 428—430. It will likewise be perceived, however, that if passage opening 448 is closed, imposition of suction into the upper part of cylinder 420 will reciprocate the piston 422 upwardly toward a position for operating arm 406.

It must now be understood that each of the sheet detectors 400 is so disposed that a sheet or sheets of paper being lifted by the lift assemblies 376 will just clear a flat edge 450 of element 426 when the latter is in its normal position and will be brought into covering relationship to openings 448 of passages 446. The reciprocation of rods 160 and 164 is such that a sheet of paper picked up by the lift assemblies 376 will be brought into such closing relationship with passages 446 before opening 436 of valve assembly 364 is brought into communication with outlet 434 by the rocking of suction pipe 182. Continued motion of pipe 182 then brings opening 436 into communication with outlet 434 and imposes a suction through passage 428—430 into the upper portion of cylinder chamber 420. Presuming that one or more sheets of paper carried by the lift assemblies 376 are closing the passages 446, piston 422 will be reciprocated upwardly toward a position for operating arm 406. As piston 422 reciprocates upwardly, it is rotated by the action of pin 444 in groove 442 thereby turning the sensing element 426 so that a machined face 452 thereof underlies the sheet or sheets of paper being held below passage openings 448 by the lift assemblies 376. Further assuming that the block 418 has been properly positioned relative to arm 406 of switch 404 by adjusting means 414, if only a single sheet of paper has been lifted by the lift assemblies 376, as is desired, piston 422 will be permitted to reciprocate upwardly sufficiently to operate arm 406 just as face 452 of element 426 comes in contact with the lower surface of the sheet of paper, thereby stopping further reciprocation. On the other hand, again assuming proper adjustment, if more than a single sheet of paper is being held by the lift assemblies 376 below passage openings 448, the combined thicknesses of such sheets will serve as a stop for surface 452 of element 426 and will prevent reciprocation of piston 422 a sufficient distance to operate the arm 406 for opening the switch 404.

It will now be apparent from Fig. 15 that if piston 422 has not been reciprocated sufficiently to open the switch 404 on each of the sheet detectors 400 when cam 131 closes switch 90, the coil 46 will be energized and motor 36 stopped. It may be noted that means not shown are provided for maintaining the motor 36 de-energized until a manual resetting operation has been performed after appropriate correction of the difficulty with the set of lift assemblies 376 that has either failed to pick up a sheet at all or has picked up more than a single sheet. On the other hand, it will be equally clear that if the lift assemblies 376 function properly to pick up only a single sheet as they normally will except in cases of irregularities of the sheets in the paper supply, all of switches 404 will have been opened by full reciprocation of the piston 422 prior to and during the time that switch 190 is closed by cam 131, so that the energization of motor 36 is not affected. An indicator light 454 may conveniently be provided upon the top of each sheet detector 400 and connected by circuit means not shown for indicating whenever the switch 404 of that particular detector 400 does not open during the closing of switch 190, such indication being helpful in immediately spotting the set of lift assemblies 376 in connection with which difficulties have arisen.

Referring now to Figures 1, 2, 3, 4, 6, 7 and 14, there is illustrated the construction of the glue applicators 208 as well as their disposition. It will be noted that one glue applicator assembly 208 is provided for each feed table 256 or, more commonly stated, at each "station" of the apparatus of the invention.

Figure 6:
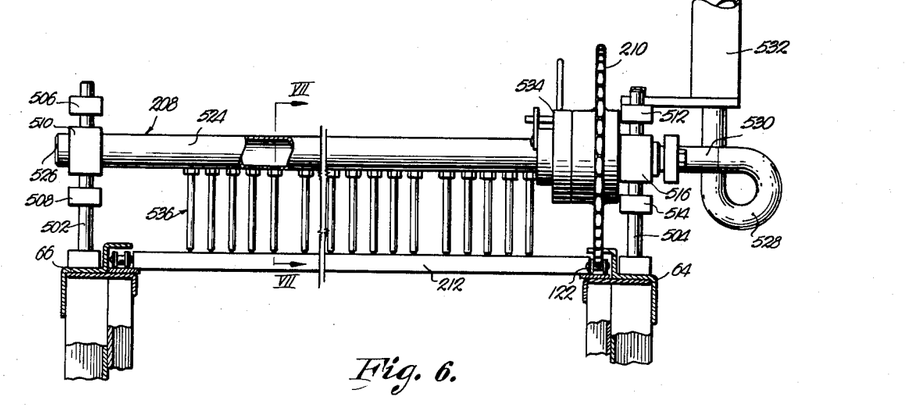
Fig. 6 is a view, partly in end elevation and partly in section, of one of the adhesive applicators and its mounting structure.

As will be most clear from Figs. 2 and 6, a pair of spaced, upstanding rods 502 and a similar pair of spaced, upstanding rods 504 are respectively mounted upon side members 66 and 64. Rods 502 are parallel and interconnected by crosspieces 506 and 508 which are vertically spaced upon the rods 502. Slidably mounted on rods 502 between crosspieces 506 and 508 is a vertically reciprocable bearing block 510. Similarly, rods 504 are parallel and are interconnected by spaced crosspieces 512 and 514 to limit the movement therebetween of a vertically reciprocable bearing block 516 slidably mounted upon the rods 504. Each of blocks 516 is biased downwardly by spring means 518 and the extent of its downward travel limited by an adjustable screw 520 in crosspiece 514, the spring 518 being interposed between crosspiece 512 and the block 516. Comparable spring means 520 and limit means 522 are provided for reciprocable block 510. Rotatably journalled in blocks 510 and 516 is a tubular shaft 524 extending beyond each of the blocks 510 and 516. Shaft 524 is closed at one end as at 526 and is placed in communication with a flexible tubing 528 through suitable packing means 530 the details of which form no part of this invention and need not be described in detail. A container 532 for glue or other adhesive is disposed above the end of shaft 524 in communication with tubing 528, and the latter communicates with container 532 to carry a supply of adhesive into the interior of tubular shaft 524. A sprocket 210 is provided on each shaft 524 and is adapted for rigid connection thereto by any suitable clutch assembly 534. Sprocket 210 is in engagement with conveyor chain 122 as hereinbefore described, so that shaft 524 is rotated at predetermined speed.

Figure 7:
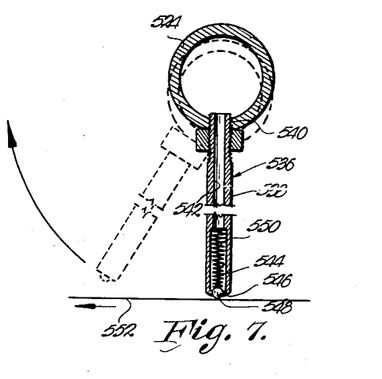
Fig. 7 is a cross-sectional view taken on line VII—VII of Fig. 6.

Disposed at spaced intervals and in alignment along the length of hollow shaft 524 are a number of individual glue spotting assemblies broadly designated by the numeral 536. Each gluing assembly 536 comprises a hollow, elongated tube 538 threadably mounted at one end thereof in shaft 524 as at 540. A bore 542 extends longitudinally through each tube 538 and is provided with an enlarged portion 544 adjacent the end of tube 538 remote from shaft 524. The end of each tube 538 is inwardly flared as at 546 to retain a small metallic sphere 548 within bore 542 but adapted for a portion of the surface of such ball 548 to extend beyond the end of tube 538. A coil spring 550 is provided within enlarged portion 544 of bore 542 for yieldably biasing ball 548 to a position extending partially from the end of tube 538 remote from shaft 524. Since bore 542 is in communication with the hollow interior of shaft 524, and since the latter is filled with adhesive flowing from the elevated container 532 through tubing 528 and means 530, it is clear that the bore 542 will be filled with adhesive and that same will pass into enlarged portion 544 to maintain ball 548 in a wedded condition. It will thus be clear that as shaft 524 rotates, balls 548 are adapted to place a spot of glue upon any body with which they come in contact. In Fig. 7, the numeral 552 represents the top sheet of paper of a stack of one or more of same being carried in the direction indicated by the arrow upon one of the trays 212. The position of the shaft 524 and its attached assemblies 536 are indicated in dotted lines in this figure for the condition when balls 548 are not in contact with the paper 522, it being noted that the bearing blocks 510 and 516 are then in their lowermost positions. As the shaft 524 continues to rotate by virtue of the driving connection between chain 122 and the sprocket 210, the shafts 524 and assemblies 538 will arrive at the operative gluing position illustrated in solid lines in the figure, it being noted that in this condition the bearing blocks 510 and 516 have been reciprocated upwardly against the yielding resistance of springs 518 and 520 because of the upward force exerted upon the assemblies 536 by their engagement with the paper 552 on the tray 212.

It is significant that ball 548 of each of the glue assemblies 536 must be firmly pressed against the sheet of paper 552 in order to assure positive gluing action. However, since the sheet 552 is continuously moving on a tray 212, it is manifest that such desired result could not be obtained with gluing assemblies 536 capable only of vertical reciprocation without movement in the same direction as the paper 552. The solution to the problem is to provide for rotation of the assemblies 536 in the same direction and at a rate such that the gluing balls 548 move at exactly the same speed as the paper 552 during the period of contact therebetween. By utilizing such principle, this invention has overcome the tendency for the glue-applying means to rumple or disturb the register of sheets or to otherwise mar the paper 552, while still assuring that the desired gluing action will be accomplished in a positive manner.

Referring now particularly to Figs. 1, 2, 5 and 14, there is illustrated in detail the means for delivering stacks of papers removed from trays 212 by the stripper elements 250 to an endless conveyor belt 600 illustrated in Fig. 1, which delivers the stacks to an operator or receptacle not shown. The particular advantage of the delivery means to be described is its ability to receive stacks of papers from the stripper elements 250 and rapidly remove the same from the trays 212 without disturbing the register between newly glued sheets included in the stack. A set of lower delivery rollers 602 are rigidly mounted on a shaft 604 which is in turn rotatably mounted on plates 248. Shaft 604 has a sprocket 606 mounted adjacent the end thereof. A rocker shaft 608 is rotatably journalled in upstanding brackets 610 and rigidly carries thereon a rocker arm 612. Rotatably journalled in the opposed rocker arm 612 is an upper delivery roller shaft 614 having a number of upper delivery rollers 616 rigidly mounted thereon and disposed directly above lower delivery rollers 602. Shaft 608 is rotatable through an arc swinging arm 612 to move rollers 602 and 616 into and out of engagement with each other. Sprocket 606 is driven by a chain 608 trained over drive sprocket 84, a driving sprocket 622 for conveyor belt 600, an idler sprocket 618 on shaft 608 having integrally formed therewith a gear 620 and other idler sprockets to rotate rollers 602 in a direction for advancing stacks of papers stripped from tables 212 by the elements 250. Gear 620, which is driven by its integral sprockets 618, meshes with a gear 624 rigid to shaft 614 to rotate the latter and thereby upper delivery roller 616 regardless of the rocked position of arms 612. Rigidly attached to shaft 608 is a crank extension 630 adapted to be swung by the projection 202 on cam-operated plate 196, as will be most clear in Figs. 2 and 14.

It should now be understood that the operation of the plate 196 through engagement of follower 94 with cam 132 is so timed as to swing the crank extension 630 for rotating shaft 608 to raise upper delivery roller 616 out of contact with lower delivery roller 602 at the instant when the leading edge of a stack of papers from a tray 212 is being delivered therebetween. As soon as such stack of papers has passed a short distance between the rollers 602 and 616, the cam 132 operates to permit swinging of crank 630 to rock arm 612 counterclockwise as shown in Fig. 5 to a position where lower delivery roller 602 and upper delivery roller 616 are tightly engaging and feeding the stack of papers therebetween toward conveyor belt 600. Since such stack of papers is not gripped by rollers 602 and 616 until it has passed partially therebetween, the tendency for such rollers to disturb the register of newly glued sheets is avoided.

Referring now to Fig. 16 wherein is shown a modified form of feed table arrangement, there is illustrated an elongated bar 702 pivoted to the post 62 as at 704. The inclination of bar 702 from the vertical is controlled by adjustment of a chain or the like 706 over a stop 708 suitably mounted upon the frame 50. The table assembly itself, which is generally designated by the numeral 710, is generally similar to that above described for tables 256, except that same include a top 712 mounted on opposed side plates 714 which are pivoted to the main side plates 260 as at 716, rather than directly attached to the latter. Such pivoting of the top and auxiliary side plate portions 712 and 714 of the table permits inclination of such top 712 from the horizontal through swinging movement relative to main plates 260. A follower 718 is provided upon auxiliary plate 714 and disposed to engage the uppermost edge 720 of bar 702. It will be clear from the figure that, as the table assembly 710 is raised by chain 278 as hereinbefore described, the degree of inclination from the horizontal of top 712 decreases. This is consistent with the purposes and objects of such modified construction, namely, to urge the uppermost papers upon a high stack of same resting upon top 712 toward the edge of table 710 adjacent the chains 278, in order that the lift assemblies 376 will make proper contact with the uppermost sheet. It is found in practice that with certain types of paper a relatively high stack thereof may tend to become offset in one direction or another. The structure shown in Fig. 16 assures that the entirety of a stack of paper on top 712 will remain in the desired position, it being noted that the degree of inclination of top 712 decreases in accordance with the height of the stack remaining thereon.

*Operation*

Although the operation of the apparatus of this invention will no doubt be obvious to those skilled in the art from an examination of the accompanying drawings in light of the foregoing description of the structure involved, a summarized statement of the manner of operation of the apparatus may be helpful to those not familiar with this general class of equipment.

Assume first, then, that an operator has placed upon the top 264 of each of a plurality of the spaced, feed table assemblies 256, a pile or stack 338 of sheets of paper or other material to be assembled into pads or the like with a sheet from each pile 338 included in each pad and arranged in predetermined order corresponding to the relative location of the assemblies 256, it being noted that the sheet from the pile 338 on the assembly 256 nearest the direction from which conveyor chains 120 and 122 advance over assemblies 256 will be on the bottom of the pad, and sheets from piles 338 on assemblies 256 disposed along the path of travel of chains 120 and 122 will be progressively disposed atop the sheet from the first mentioned pile 338. Assuming that the sheets in different piles 338 are of different colored stock, are differently printed or are otherwise distinguishable and require particular arrangement in the finished pads or the like, the great utility of the apparatus will be apparent. If the sheets are perforated adjacent one edge thereof, which is often the case with the types of sheets used in the assembly of many types of pads, the pins 292 may be utilized to maintain the sheets of each pile 338 in aligned or neatly stacked array upon the assemblies 256. If the sheets are not so perforated, the guide elements 286, as well as additional guides (not shown) which may obviously be provided if desired, serve the same general purpose as that preferably performed principally by pins 292. With the modified feed table assemblies 710 (see Fig. 16), the tilting of same further aids guide elements 286 in maintaining the piles 338 in the desired disposition.

The operator may then, by adjusting each of the manual hand cranks 312 with lever 318 swung upwardly to raise dog 314 out of engagement with ratchet 310, move the chains 278 corresponding to each feed table 256 to position the latter so that the uppermost sheet of each pile 338 is properly engaged by the fingers 336 and disposed for being lifted from the pile 338 by the sucker lift assemblies 376. The manner by which hand cranks 312 are adapted to accomplish such positioning of the feed tables 256 will be clear particularly in Fig. 10.

With the piles 338 of sheets to be assembled thus disposed upon feed tables 256 and the latter properly positioned, the main power switch 24 may be closed to energize the main drive motor 36 and the pump drive motor 30. Energization of main drive motor 36 results in commencement of advancement of the conveyor chains 120 and 122 through the operable connections hereinbefore described. Energization of pump drive motor 30 operates suction pump 32 and pressure pump 34 to supply suction pipe assembly 184 and a compressed air line 802 respectively. Compressed air line 802 is coupled through a plurality of feed lines 804 (see Fig. 3) with a plurality of outlet nozzles 806 (see Figs. 1 and 10), which direct a continuous stream of air toward the forwardmost ends of the sheets of each pile 338 to expedite the separation of the top sheet thereof from the underlying ones when such top sheet is contacted by the sucker lift assemblies 376. The vacuum line 184 is coupled through valve assemblies 364 with the sucker lift assemblies 376 and the sheet detectors 400 provided for operation in conjunction with each of feed tables 256.

Advancement of conveyor chains 120 and 122 results in similar advancement of the spaced trays 212 carried thereby. As the trays 212 reach a predetermined position relative to the feed tables 256 toward which they are advancing, cam 128 and its follower and connecting assembly 186—172—174—176 operate to rockingly rotate section 182 of vacuum line 184, thereby operating suction valve assemblies 364 in the manner hereinbefore described in detail. The operation of such valve assemblies 364 results, first, in the supply of suction to the sucker lift assemblies 376 during the time that they are lowered toward the uppermost sheets of the piles 338 by means of the crank and connecting assembly 150—164, the time that they contact and lift such uppermost sheet from each of the piles 338 and carry the same to operative positions relative to the sheet detectors 400 and until the suction supplied to lift assemblies 376 is cut off to drop the sheets upon the trays 212 which meantime have advanced to positions passing thereunder.

The operation of the sheet detectors 400 has already been described in substantial detail and need not now be repeated. It is noted, however, with reference being made particularly to Fig. 15, that each of the sheet detectors 400 is provided with a switch 404 which is adapted to be opened only if the sheet detector 400 registers the fact that a single sheet of proper thickness has been presented to it. Cam 131 is adapted to close switch 190 at one moment during each sheet detecting cycle with the result that, should any switch 404 not have been opened, relay coil 46 could be immediately energized to break relay switch 44 and deenergize the main drive motor 46. This provides an automatic interlock against continued operation of the apparatus, in the event of any failure involving the picking up of more or less than one sheet from any pile 338 by the sucker lift assemblies 376 operative with respect thereto.

As the sheets from piles 338 are deposited upon trays 212, and as the latter are advanced by conveyor chains 120 and 122, sprockets 210 are operated to rotate adhesive applicators 203 in synchronization with the advancement of trays 212 so that glue assemblies 536 will contact the trailing edge of the uppermost sheet upon each tray 212 to apply a spot of adhesive thereto. It will be clear that, as each tray advances to the next operative position for receiving another sheet from the next pile 338 thereupon, the spots of adhesive applied at the last operative position or station will serve to adhesively hold such last deposited sheet upon that portion of the pad of sheets therefore gathered upon the tray 212. It may be noted that the operative station closest the delivery end of the apparatus normally has its applicator assembly 208 not supplied with adhesive material, the action of the applicator assemblies 536 being utilized merely to press the last deposited sheet down upon the underlying, adhesive bearing sheets. The uniquely advantageous results attained with the adhesive applicator means 208 forming a part of this invention are attributed largely to the fact that the applicators 208 are rotating in synchronization with advancement of conveyor chains 120 and 122 in such manner that the applicator assemblies 536 and particularly the sheet contacting spheres 548 travel with the sheets upon each tray 212 at the same rate of movement as such sheets upon the trays 212.

This obviously prevents shifting of register, ruffling and other undesired effects.

As the section trays 212 approach the delivery end of the apparatus, the pads upon the trays 212 are stripped therefrom by the stripper elements 250. Due to the sectioned nature of trays 212, such action is independent of the dimensions of the sheets or assembled pads within wide limits. The pads are then received by delivery rollers 602 and 616 which advance the pads to the delivery conveyor belt 600 without disturbing the register thereof.

Although many more details of operation could be enumerated, it is felt that the operation of the various cooperating components of the apparatus will be best understood from the detailed descriptions thereof hereinbefore set forth. When such detailed explanations are considered in conjunction with the résumé of operational functioning just completed, the many advantages of the apparatus of this invention over previously known machines will be obvious to those skilled in the art.

Since the apparatus of this invention involves the combination of structure providing a number of improved features, it will be clear that modifications or changes of the structure to forego the enjoyment of one or more of such improved features does not depart from the true spirit and contemplation of the invention. Moreover, it is manifest that many minor alterations could be made in the construction from the illustrative details shown and described without departing from the teachings or intentions of the invention. Accordingly, it is to be understood that the invention shall be deemed limited only by the scope of the appended claims.

Having thus described the invention what is claimed as new and desired to be secured by Letters Patent is:

1. In paper gathering apparatus having a conveyor and power means for operating same, vertically shiftable means for supporting a pile of sheets, said means including a pair of stationary, opposed, elongated, vertical track members; a pile supporting table; roller means on the table received by the members to mount the table for vertical movement in a predetermined path; a pair of rotatable elements respectively mounted above and below the highest and lowest levels of movement of the table; an endless, flexible assembly trained around said elements; means connecting the assembly with the table; means including a ratchet mechanism coupled with one of said elements and adapted for operable coupling with said power means for operating said one element to advance the assembly and thereby raise the table; and an elongated rail member having its longitudinal axis angled from vertical, said table being provided with a pile-receiving top swingably mounted thereon, said top being provided with a roller assembly attached thereto and adapted to ride upon said rail member for swinging the top to various positions of tilt as the table is raised.

2. In the invention as set forth in claim 1, wherein said rail member is pivotally mounted, and there is provided means for swinging said rail member to various positions to change the inclination thereof from vertical.

3. In the invention as set forth in claim 1, wherein said rail member extends between the plane of said pair of track members and the axis of swinging movement of said top relative to the table, said roller assembly engaging a surface of said rail member facing away from said plane.

References Cited in the file of this patent

UNITED STATES PATENTS

| | | |
|---|---|---|
| 953,840 | Kacha | Apr. 5, 1910 |
| 1,966,900 | McElroy | July 17, 1934 |
| 2,074,330 | Grover | Mar. 23, 1937 |

FOREIGN PATENTS

| | | |
|---|---|---|
| 51,894 | Denmark | July 20, 1936 |